April 9, 1963
A. J. AMATO
3,084,589
EDUCATIONAL DEVICE
Filed June 8, 1960
2 Sheets-Sheet 1
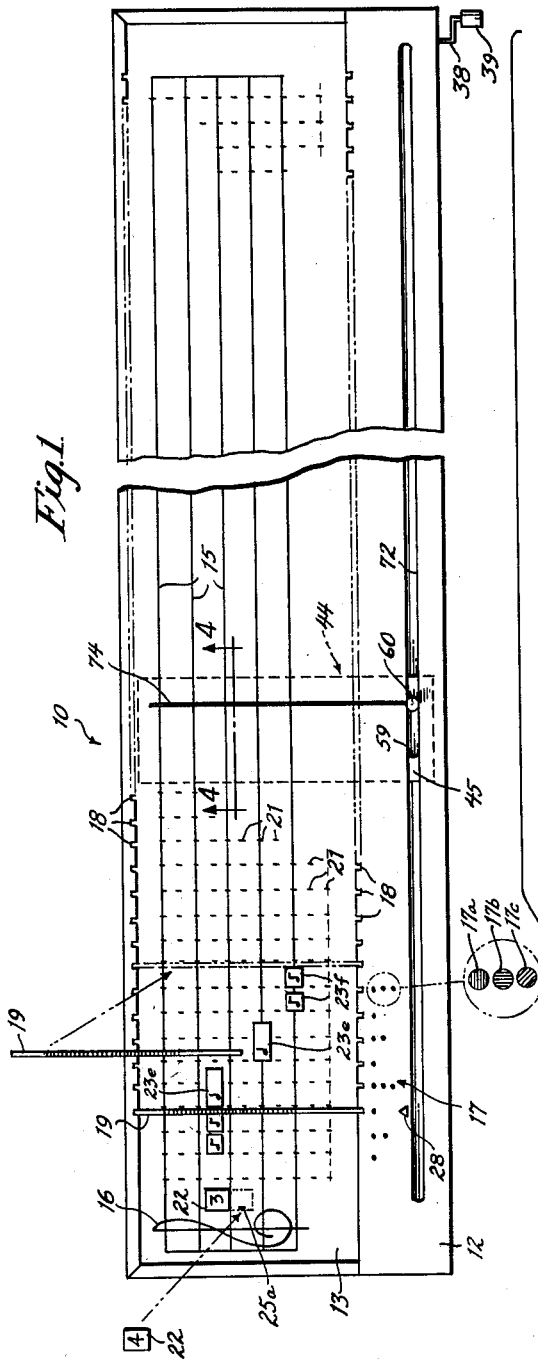
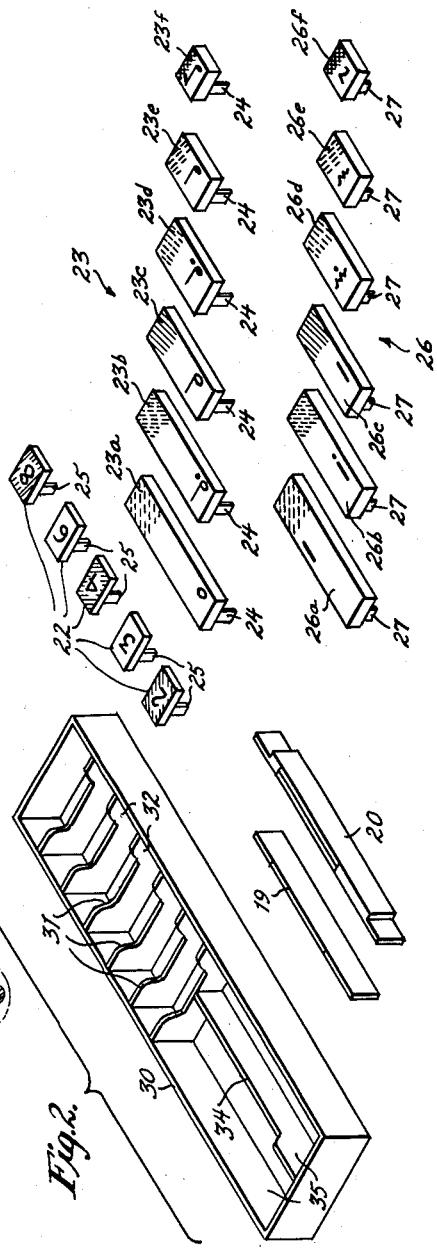
INVENTOR.
ANTHONY J. AMATO
BY Jacob Trachtman
ATTORNEY.

April 9, 1963 A. J. AMATO 3,084,589
EDUCATIONAL DEVICE
Filed June 8, 1960 2 Sheets-Sheet 2
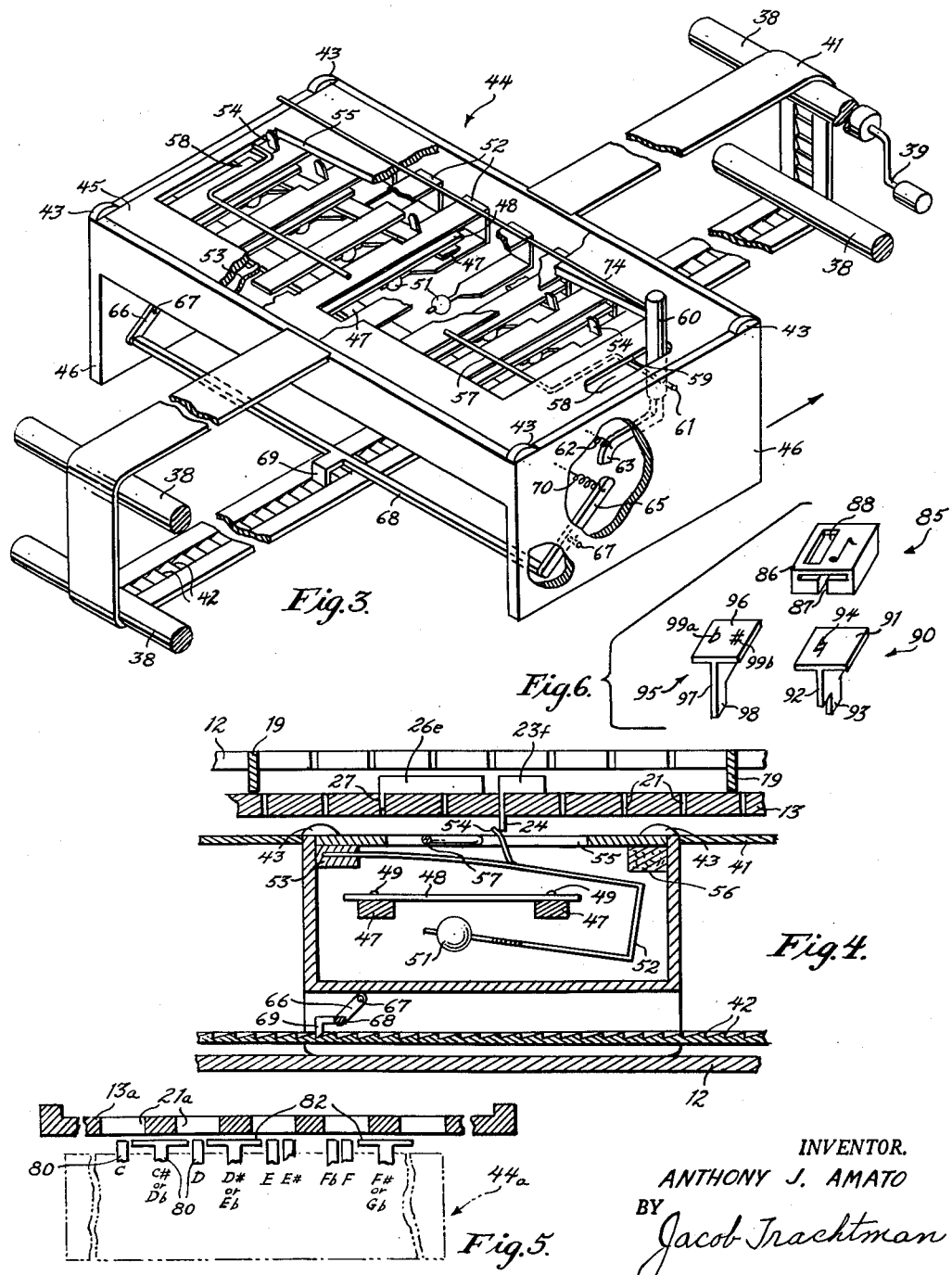
INVENTOR.
ANTHONY J. AMATO
BY Jacob Trachtman
ATTORNEY.

United States Patent Office 3,084,589
Patented Apr. 9, 1963

3,084,589
EDUCATIONAL DEVICE
Anthony J. Amato, 2234 Emerson St., Philadelphia, Pa.
Filed June 8, 1960, Ser. No. 34,661
13 Claims. (Cl. 84—470)

This invention relates to an educational apparatus and, more particularly, to a musical educational apparatus.

It is an object of the present invention to provide an educational device for teaching the reading and composition of music which may be readily used by persons of all age groups, in a beneficial and effective manner.

Another object of the present invention is to provide a combination musical instrument and musical educational device which will provide for the individual selection of notes to be played upon a selection board and the subsequent audible playing of such selection by a sound unit directly controlled thereby.

Another further object of the present invention is to provide a musical composing device resembling an enlarged staff upon which selective elements resembling musical notes are placed in a sequential arrangement, and which elements serve to actuate a sound unit displaced with respect thereto to produce an audible signal substantially reproducing the arrangement of notes selected upon the panel.

Another object of the present invention is to provide a musical appliance employing conventional musical symbols and notes which may be selectively arranged by a user to designate an original composition, and which by such arrangement controls the actuation of a sound unit having a plurality of individual sound elements for audibly reproducing the selected composition in response to relative movements between the sound unit and the selector panel.

A more specific object of the present invention is to provide a color coded musical composition device in which all identical notes and reference points are discretely colored to correspond to the respective notes and symbols in accompanying sheet music, thus facilitating the placement of corresponding note bars which control the operation of a plurality of individual sound elements in response to relative movement between such sound elements and the prearranged note bars.

Another specific object of the present invention is to provide a musical combination device in which each bar of music may be adjusted to correspond with a selected time signature, and which the size of the respective note bars is directly proportional to the time value thereof, to provide a visual and mechanical arrangement assuring the proper distribution of notes within each bar of composed music and in accordance with the time signature of the composition.

All of the foregoing and still further objects and advantages of this invention will become apparent from a study of the following specification, taken in connection with the accompanying drawing, wherein:

FIGURE 1 is a top plan view, of the educational device;

FIGURE 2 is an enlarged exploded perspective view of various composing parts of the present invention;

FIGURE 3 is an enlarged fragmentary perspective view, with parts broken away, of a sound unit and manually operated actuated means forming certain parts of the present invention;

FIGURE 4 is a fragmentary cross sectional view of certain parts of the assembly taken on line 4—4 of FIGURE 1, illustrating the manner in which the unit is operated;

FIGURE 5 is a fragmentary cross sectional view of a modified form of construction; and FIGURE 6 is an enlarged exploded perspective view of a note bar assembly forming a part of the construction shown in FIGURE 5.

Referring now to the drawing, and more particularly to FIGURE 1 thereof, an educational device 10 made in accordance with the present invention is shown to include an elongated substantially hollow prismatic housing 12 having a composition panel 13 recessed below the uppermost surface thereof.

Imprinted upon the composition panel 13, are a plurality of parallel lines 15 defining a staff, and a clef 16. The marginal portions of the housing 12 on each lateral side of the panel 13 are provided with a plurality of longitudinally spaced apart and transversely aligned slots 18 which slidably receive the opposite ends of single line bars 19 and double line bars 20 which are arranged upon the staff 15 in accordance with different colored time signature plates 22. Each of the plates 22 has a depending tab 25 so that a selected time signature may be designated along side the clef 16 by inserting the tabs 25 of the selected plates 22 into a set of slots 25a provided therefor. Also imprinted upon the panel 13 is a beat indicator guide 17 having rows of differently colored dots 17a, b, c and an upbeat indicator 28. Each row of dots is colored to match the color of one of the time signature plates 22.

Each of the staff lines 15 and each of the spaces therebetween is provided with a continuous series of longitudinally spaced apart slots 21 which are aligned with the line bar slots 18. These slots 21 slidably receive depending tabs 24 of tab bars 23 that are arranged upon the composition panel 13. These tabs 24 project below the level of the composition panel 13 and serve as selector means in a manner hereinafter more fully described. However, these note bars 23 are provided in an assortment of sizes, each having its identifying note value indicia imprinted thereupon. The length of each such note bar 23 is thus directly proportional to the time value indicated thereby. Accordingly, the whole note bar 23a is longer than the dotted half note bar 23b, which is longer than the half note bar 23c. Thus, the length of each of the half note bars 23c, dotted quarter note bars 23d and quarter note bars 23e is proportionally longer than the eighth note bars 23f. The same relative sizes are maintained in a set of rest bars 26, including whole rest bars 26a, dotted half rest bars 26b, half rest bars 26c, dotted quarter rest bars 26d, quarter rest bars 26e, and eighth rest bars 26f. Each of the rest bars is further provided with a depending tab 27 substantially identical in shape to but shorter than the depending tabs 24 of the note bars 23.

A composition box 30 is provided with transversely extending partitions 31 which divide a portion of the length thereof into separate compartments 32, into which each of the different size note and rest bars may be arranged. A longitudinal partition 34 divides the remaining portion of the length of the composition box 30 into a pair of line bar compartments 35 for the single and double line bars 19, 20.

Reference is now made to FIGURES 3 and 4 of the drawing which illustrate the manner in which the sound unit is arranged for movement within the housing 12. A pair of transversely extending shafts 38 are rotatably supported at each end of the housing 12, one such shaft 38 being provided with an outwardly extending handle 39 for manual actuation. A drive belt 41 is trained about the shafts 38, while the inside surface of such belt 41 is provided with a continuous series of sprocket detents 42. These detents 42 serve to control the movement of the sound unit carriage 44 throughout the length of the housing 12 in a manner hereinafter more fully described.

The sound unit carriage 44 includes a sound box 45 having depending ends which may be slidably supported upon the lower wall of the housing 12 for supporting the entire sound unit for longitudinal reciprocating movement along the length of the housing. A pair of cross bars 47 extending between the ends 46 of the sound box support a plurality of laterally spaced apart sound bars 48 which are positioned by pins 49. These sound bars 48 are of different lengths so as to provide a plurality of discrete signal means, each of which is actuated by an individual striker 51. Each striker is carried at one end of a frame-like actuating spring 52, the opposite end of which is secured within an anchor bar 53 of the sound box 45. Each such actuating frame 52 is provided with an upwardly projecting finger 54 which serves as a pressure responsive sensing means that extends through an opening 55 on top of the box 45 and intersects with a plane defined by the lowermost ends of the selector means tabs 24 of the note bars 23, which are mounted within the slots 21 of the composition panel 13. A separate signal bar 48 is provided for each one of the lines and spaces of the staff, thus enabling the selected placement of the note bars to control the actuation of each one of the sound bars. However, since the length of the tabs 27 of the rest bars do not project beneath the lower surface of the composition panel 13, they have no effect upon the sensing fingers 54 of the actuating mechanism and serve only for the purpose of designating the rest and to occupy the proportionate space of the bar of music. A felt strip 56 serves to dampen the spring action of the actuating frames 52.

The striker depressor bar 57 mounted upon offset arms 58 at opposite ends, may be selectively actuated by a handle 60 to depress the actuating springs 52 of each sound bar below the plane defined by the innermost ends of the selector tabs 24, whenever required, such as during adjustment of the carriage 44. This handle 60 extends upwardly through a slot 59 in the carriage box 45 and through a longitudinal slot 72 in the top of the housing 12. The handle 60 is also pivotally supported upon a pivot pin 61 on one end 46 of the sound box 45 and has a depending foot 63 which is movable into pressure engagement with an adjacent end of a lever 65. This lever 65, together with a link 66, both pivotally mounted upon individual pivot pins 67, supports a transversely extending rod 68 having a central pawl 69. A spring 62 yieldably retains the foot 63 out of engagement with the adjacent lever 65 which, in turn, is yieldably biased in one direction by a separate tension spring 70 in a direction which urges the pawl 69 into engagement with a sprocket detent 42 of the drive belt 41. Projections 43, which are engageable with the lower surface of the panel 13 prevent tilting of the sound unit during return movement thereof by the handle 60.

It will now be recognized that in actual use, rotation of the handle 39 in a clockwise direction as viewed in FIGURE 3, will cause the drive belt 41 to move the sound unit carriage 44 in the direction of the arrow while the sprocket detents 42 prevent movement in the opposite direction. During this longitudinal movement of the sound unit, any depending selector tabs 24 of the note bars 23 mounted upon the composition panel 13 in the path of movement of the pressure responsive sensing fingers 54, will cause the actuation of each striker 51 upon the respective signal sound bars 48 to reproduce the sound designated by the position of the note bar. Then, depending upon the count value of the note bar, another note will not be sounded until the next arranged tab of the subsequent note bar actuates its associate striker. During movement of the sound unit carriage past a rest, no sound is produced, since the tabs 27 thereof do not project into the path of movement of the fingers 54. A pointer 74 carried by the handle 60 provides a visual indication of the note being played as the carriage 44 moves along the length of the housing 12. A completely new arrangement can be composed simply by interchanging, adding, or removing any of the note and rest bars as may be required.

In setting up the apparatus to play a song, whether from sheet music or an original composition, both figures of the time signature are placed in position, whereby the color of the lowermost figure is clearly visible. This color corresponds with one of the three rows of dots 17a, b, c of the beat indicator guide 17. The upper figure of the time signature indicates the slots opposite the dots in the selected row in which a bar line is to be placed. By way of example, the number 2 signature tab is colored blue, the number 4 time signature tab 22 is colored red, and the number 8 time signature tab 22 is colored green. Therefore, the presence of the denominator "2" (which is colored blue) in a time signature of $$\frac{2}{2}$$

indicates that a bar line is to be placed in a slot opposite every second blue dot 17c. The blue row of dots is chosen because the underside of the lower figure "2" is blue. If the lower figure is "4", which has the color of red, then the red row would be chosen for the placement and counting of the bar lines. A bar line is placed in every second slot of the row indicated by the lower figure because the upper figure is "2". If the upper figure was "3", a bar line would be placed in every third slot 18. If such upper figure were "4", a bar line would be placed in every fourth slot 18. Thus, the placement of each bar line is determined by the time signature tabs 22 placed adjacent to the clef 16. A double bar line 20 is placed at the end of the song.

The appearance of the upbeat indicator 28 in some songs indicates that the first bar line 19 is to be placed in the slot 18 immediately adjacent to the upbeat indicator 28, regardless of the designation of the time signature. Thereafter, the placement of the other bar lines follows the procedure hereinbefore explained.

Each of the different note and rest bars 23, 26 are colored according to their respective time values. Also, the notes on the sheet music provided with the apparatus are colored to correspond with the colors of the respective note and rest bars. Therefore, in following sheet music, the particular note and rest bars 23, 26 are selected by color, according to the color of the corresponding notes in the sheet music. It is then only necessary to determine the line or space in which each such note is to be placed as the sheet music is referred to. Upon proper placement of the notes, the total length of the assembled note and rest bars in each bar of music will approximately equal the distance between the adjacent line bars of each such bar of music. This is due to the fact that the length of each such rest bar is related to the time value thereof and due to the fact that the line bars have been previously placed in accordance with the time signature which determines the time length of each such bar of music.

Sufficient space is provided between note and rest bars to accommodate insertion of the relatively thin portions of the line bars 19, as is quite clearly shown in FIGURE 4.

Now assuming the note and rest bars, as well as the line bars have been properly placed, rotation of the crank handle 39 in a clockwise direction will cause the carriage 44 to move from left to right within the housing, thus causing the depending tabs 24 of the note bars to actuate the fingers 54 of each tone bar 48 to reproduce the original or prepared sheet music.

Reference is now made to FIGURES 5 and 6 of the drawing which illustrate a slightly modified construction in which the composition panel 13a is provided with a larger number of positions within slots 21a to allow for the reproduction of a complete octave of a chromatic scale. In this arrangement, a sound unit 44a has a larger number of fingers 80 which control the actuation of a corresponding number of sound bars in a manner similar to that hereinbefore described. However, some of the fingers 80 are provided with cross bars 82 which project into the space beneath both of a pair of adjacent slots 21a. These cross bar fingers 80 thus control actuation of sound bars which reproduce flats and sharps, as indicated in FIGURE 5, thus covering a complete octave of a chromatic scale. The actuation of any one of the fingers or cross bars in the vicinity of each such slot 21a is controlled by a modified form of note bar assembly 85 including a base 86 with a T-slot 87 and window opening 88. This base 86 is colored in the same manner as its counter part note bar 23f, hereinafter described so as to be readily identifiable in accordance with the color arrangement of the sheet music, and is identified by suitable indicia upon the upper surface thereof. A first neutral tab adapter 90 is provided and includes a plate 91 and depending stem 92, both of which are received within the T-slot 87 of the base 86. The stem 92 is provided with a depending tab 93 centered intermediate the opposite ends thereof. Neutral indicia 94 is imprinted upon the upper surface of the plate 91, so as to be visible within the window opening 88 of the base 86 depending upon which way it is inserted into the slot 87. As the tab 93 is centrally located beneath the opposite ends of the stem 92, this neutral adapter 90 when assembled with the base 86, and placed within one of the slots 21a of the composition panel 13a, will actuate only a centrally disposed finger 80. However, by using a sharp or flat adapter 95, a sharp or flat note may be sounded by engagement of its tab 98 with one of the off-centered fingers 80 or ends of a cross bar 82.

The sharp and flat adapter 95 includes a plate 96 with a depending stem 97 in which the tab 98 is positioned at one end of the stem and insertable into the T-slot 87 of the base 86 in either direction. When inserted in one direction, the flat indicia 99a will be visible through the window 88, whereas the sharp indicia 99b will be visible through the window 88 when the adapter 95 is inserted in the opposite direction. Thus, with the three elements 86, 90, 95 of this modified form of note bar, it is possible to arrange for the sounding of a neutral, sharp, or flat note whenever required. Except for the cross bars 82, and the position of the cross bars 82 with respect to the fingers 80, the actuation of the respective sound bars of the sound unit is substantially as hereinbefore described in connection with discussion of FIGURES 3 and 4.

In actual use, the handle 39 is rotated by a constant speed, whereby the carriage of the sound unit will move along the length of the housing, with the actuating means effecting operation of each signal sound bar means as the pressure responsive sensing fingers 54 abut the depending tabs 24 of the note bars. After the sound unit has reached the end of the housing 12, the handle 60 is rotated, whereby the striker depressor bar will press the spring frame 52 of the strikers 51 and simultaneously elevate the pawl 69 from engagement with the sprocket detents 42 to allow the sound unit to be manually retracted to its starting position. Release of the handle 60, thus returns the parts to their normal operating position ready to be moved along the length of the housing upon subsequent rotation of the operating handle 39.

While this invention has been described with particular reference to the construction shown in the drawing, it is to be understood that such is not to be construed as imparting limitations upon the invention, which is best defined by the claims appended hereto.

Having thus described my invention, I claim as new and desire to secure by Letters Patent:

1. A musical apparatus comprising a base, a horizontal panel secured with said base having a staff, a plurality of note bar receptacles through said panel along the length and width of said staff, a plurality of note bars having a tab for being received in and extending beyond the underside of said panel through respective note bar receptacles of said panel to designate particular notes on said staff and positioned along said staff to designate a selected sequence of notes, said plurality of note bars bearing the representation of respective musical notes when so positioned upon said staff of said panel showing in musical notation a selected combination of notes or musical composition, sound reproducing means movably mounted upon said base under said panel providing a plurality of discrete audible notes and actuating means sensing the presence of said note bars positioned within the receptacles of said panel by sequentially engaging their extending tabs as the reproducing means moves under said panel and sequentially respective notes corresponding to the musical notation provided by said note bars positioned upon said panel, and means for moving said sound reproducing means along the underside of said panel.

2. The musical apparatus of claim 1 in which said note bars each respectively bears a representation of a musical note with a particular time duration and each of said note bars has a physical length extending along the staff lines of said panel corresponding to the time duration of said musical note representation.

3. The musical apparatus of claim 2 in which each note bar bears a color corresponding to the time duration represented by said note bar.

4. The musical apparatus of claim 1 including a plurality of time signature plates selectively positionable on said staff for indicating a selected time signature, and a plurality of line bars positionable across said staff at respective intervals along said staff depending upon the selected time signature provided by said time signature plates.

5. The musical apparatus of claim 3 in which said panel is provided with signature plate receptacles on said staff, a plurality of time signature plates selectively receivable by said signature plate receptacles for indicating a selected time signature, said panel being provided with a plurality of line bar receptacles along said staff, and a plurality of line bars receivable by said line bar receptacles for being positioned across said staff at intervals along said staff corresponding to a selected time signature, and indicating means along said staff designating sets of positions along said staff of said line bars corresponding to respective time signatures.

6. The musical apparatus of claim 5 including a pointer means secured and movable with said sound reproducing means and positioned over the staff of said panel for indicating the note being sounded by said sound reproducing means.

7. A musical apparatus comprising a selector means having a panel with a staff thereon, bar line positioning means along said staff, note bar receptacles along said length and width of said staff provided by a plurality of rows of slots extending therethrough and positioned on each line and space of said staff, and a plurality of note bars each being selectively mountable on said panel having a base received on a line or space of said staff and a depending tab carried by said base receivable through a selected one of said slots and extending below said panel; the length of said note bars being proportional to the time count value thereof, whereby the total length of all of said note bars in a single bar of music corresponds to the distance between adjacent bar lines carried upon said panel; a sound unit supported for movement beneath said panel having means for selectively emitting a plurality of discrete notes, actuating means carried by said sound unit for sounding each of said discrete notes including a pressure responsive sensing means having a plurality of fingers in alignment with respective ones of said note bar receptacles with the movement of said sound unit beneath said panel along the length of said staff; said sensing means transmitting the arrangement of said selector means to said actuating means in response to relative movement of said sound unit and said selector means by each finger of said actuating means being actuated in response to the presence of extending tabs of said note bars in the path of movement of said fingers of said sound unit; and drive means for effecting relative movement between said sound unit and said selector means.

8. Musical apparatus as set forth in claim 7, wherein said drive means comprises a belt, a plurality of shafts carried by said selector panel supporting said belt for reciprocating movement, and clutch means releasably connecting said sound unit to said belt for movement along the length of said selector panel in response to actuation of said belt by rotation of one of said shafts.

9. Musical apparatus as set forth in claim 8, wherein said belt comprises a sprocket belt, and said clutch includes a pawl carried by said sound unit releasably engaged with said sprocket belt.

10. Musical apparatus as set forth in claim 9, further comprising a sound depressor inactivating said actuating means in response to disengagement of said pawl from said sprocket belt.

11. Musical apparatus comprising, in combination, a sound unit having a plurality of discrete audible signal means, selector means determining the sequence of operation of each of said signal means, actuating means controlling the operation of each of said discrete signal means, and pressure responsive sensing means acting between said selector means and said actuating means to control actuation of said signal means in accordance with said selector means, drive means effecting relative movement between said sound unit and said selector means, and said sensing means transmitting the arrangement of said selector means to said actuating means in response to relative movement of said sound unit and said selector means along a predetermined path, said plurality of discrete audible signal means comprising the notes of a chromatic scale.

12. Musical apparatus as set forth in claim 11, wherein said selector means comprises a panel having a staff, note bar receptacles provided along the length and width of said staff, said sound unit being supported for movement beneath said panel, note bars having an adapter tab receivable through one of a selected central and oppositely laterally off-set portions of each of said receptacles, said sound unit having a plurality of fingers movable past corresponding portions of selected ones of said receptacles for actuation by said adapter tabs, said central position of said adapter tab defining a neutral note position, one of said laterally off-set positions of said adapter tabs defining a sharp position, and the other one of said laterally off-set positions of said adapter tabs defining a flat position, and each one of said fingers controlling the initiation of said notes of said chromatic scale.

13. Musical apparatus as set forth in claim 12, wherein each one of said note bars comprises a base, and said adapter tab is adjustably mounted upon said base for movement between a neutral position depending centrally from said base and adjusted sharp and flat positions depending from laterally displaced positions of said base.

References Cited in the file of this patent

UNITED STATES PATENTS

| | | |
|---|---|---|
| 1,392,766 | Huth | Oct. 4, 1921 |
| 2,475,213 | Bancroft | July 5, 1949 |
| 2,487,138 | Howe | Nov. 8, 1949 |
| 2,619,868 | Moore et al. | Dec. 2, 1952 |
| 2,624,227 | Smith | Jan. 6, 1953 |
| 2,769,362 | Weinstein | Nov. 6, 1956 |
| 2,824,479 | De Rosa | Feb. 25, 1958 |
| 2,964,988 | Merchant | Dec. 20, 1960 |

FOREIGN PATENTS

| | | |
|---|---|---|
| 64,644 | Germany | Dec. 2, 1891 |